(12) United States Patent
Bovero et al.

(10) Patent No.: US 11,248,099 B2
(45) Date of Patent: Feb. 15, 2022

(54) CORROSION-RESISTANT COATINGS AND METHODS OF MAKING THE SAME

(71) Applicant: Saudi Arabian Oil Company, Dhahran (SA)

(72) Inventors: Enrico Bovero, Dhahran (SA); Gasan Alabedi, Dhahran (SA); Aziz Fihri, Paris (FR)

(73) Assignee: Saudi Arabian Oil Company, Dhahran (SA)

(*) Notice: Subject to any disclaimer, the term of this patent is extended or adjusted under 35 U.S.C. 154(b) by 319 days.

(21) Appl. No.: 15/650,342

(22) Filed: Jul. 14, 2017

(65) Prior Publication Data

US 2018/0016449 A1  Jan. 18, 2018

Related U.S. Application Data

(60) Provisional application No. 62/362,971, filed on Jul. 15, 2016.

(51) Int. Cl.

| | | |
|---|---|---|
| *C08J 7/043* | (2020.01) | |
| *C09D 5/08* | (2006.01) | |
| *C09D 7/62* | (2018.01) | |
| *C09D 7/65* | (2018.01) | |
| *C09D 7/40* | (2018.01) | |
| *C09D 7/61* | (2018.01) | |
| *B29C 71/02* | (2006.01) | |
| *C09D 201/00* | (2006.01) | |
| *C08K 9/04* | (2006.01) | |
| *C08K 9/10* | (2006.01) | |

(52) U.S. Cl.
CPC .............. *C08J 7/043* (2020.01); *C08J 7/08* (2013.01); *C09D 5/08* (2013.01); *C09D 7/61* (2018.01); *C09D 7/62* (2018.01); *C09D 7/65* (2018.01); *C09D 7/66* (2018.01); *C09D 201/00* (2013.01); *C01P 2002/02* (2013.01); *C08K 9/04* (2013.01); *C08K 9/10* (2013.01)

(58) Field of Classification Search
CPC .................... C09D 5/08; C09D 7/62
See application file for complete search history.

(56) References Cited

U.S. PATENT DOCUMENTS

| | | |
|---|---|---|
| 4,339,337 A | 7/1982 | Tricot et al. |
| 5,015,699 A | 5/1991 | Cotts et al. |
| 5,340,915 A | 8/1994 | Mackey |
| 5,352,764 A | 10/1994 | Mackey |
| 8,404,347 B2 | 3/2013 | Li et al. |
| 8,658,751 B2 | 2/2014 | Han et al. |
| 2005/0025971 A1 | 2/2005 | Cho et al. |
| 2005/0203333 A1 | 9/2005 | Dailey et al. |
| 2006/0040388 A1 | 2/2006 | Bromberg et al. |
| 2009/0085002 A1 | 4/2009 | Omura et al. |
| 2010/0055504 A1 | 3/2010 | Omura |
| 2012/0183811 A1 | 7/2012 | Hattori et al. |
| 2015/0240609 A1 | 8/2015 | Lucas et al. |

FOREIGN PATENT DOCUMENTS

| | | |
|---|---|---|
| CN | 102336972 A | 2/2012 |
| CN | 102964767 A | 3/2013 |
| CN | 103525224 A | 1/2014 |
| JP | S63295692 | 2/1988 |
| JP | H097162 | 1/1997 |
| WO | 2008034675 A1 | 3/2008 |
| WO | 2013142876 A1 | 9/2013 |

OTHER PUBLICATIONS

Machine translation of CN 102336972 B, published Jan. 23, 2013. (Year: 2013).*
Kataby et al., Self-Assembled Monolayer Coatings on Amorphous Iron and Iron Oxide Nanoparticles: Thermal Stability and Chemical Reactivity Studies, Langmuir, 1997, 6151-6158, vol. 13, American Chemical Society.
Database WPI Week 201431,Thomson Scientific, AN 2014-E92889 XP002773789, & CN 103 525 224 A, Jan. 22, 2014, London, GB.
Database WPI Week 198903,Thomson Scientific, AN 1989-019755 XP002773791, & JP S63 295692 A, Dec. 2, 1988, London, GB.
Database WPI Week 199712,Thomson Scientific, AN 1997-123963 XP002773792, & JP H09 7162 A, Jan. 10, 1997, London, GB.
Database WPI Week 201233,Thomson Scientific, AN 2012-C40234 XP002773790, & CN 102 336 972 A, Feb. 1, 2012, London, GB.
International Search Report and Written Opinion pertaining to PCT/US2017/042058 dated Sep. 28, 2017.
Examination Report pertaining to GCC Patent Application No. 2017/33695 filed Jul. 13, 2017, 4 pages.

* cited by examiner

*Primary Examiner* — Vickey Nerangis
(74) *Attorney, Agent, or Firm* — Dinsmore & Shohl LLP (57) ABSTRACT

Corrosion-resistant coatings and methods of making and using the coatings are provided. The corrosion-resistant coating includes magnetic particles dispersed in a polymer matrix, where the polymer matrix is non-polar and at least partially hydrophobic and the magnetic particles contain an adhesion region comprising a ferromagnetic material, and a polymer interface region surrounding the adhesion region comprising a plurality of ligands, where each ligand comprises an anchoring end and a non-polar end. Methods of producing corrosion-resistant articles are also provided. The methods include applying a corrosion-resistant coating to an article and curing the coating.

17 Claims, 3 Drawing Sheets

CORROSION-RESISTANT COATINGS AND METHODS OF MAKING THE SAME

CROSS-REFERENCE TO RELATED APPLICATIONS

This application claims priority to U.S. Provisional Patent Application Ser. No. 62/362,971 filed Jul. 15, 2016, which is incorporated by reference herein in its entirety.

FIELD OF INVENTION

Embodiments of the present disclosure generally relate to corrosion-resistant coatings and methods of making the same. More particularly, embodiments of the present disclosure relate to coatings containing magnetic particles dispersed in a polymer matrix and methods of making corrosion-resistant coatings containing magnetic particles dispersed in a polymer matrix.

BACKGROUND

Corrosion-resistant coatings are typically forced to strike a balance between water repulsion and adhesion to the underlying metal, as most coatings are made of polymers with either polar characteristics to adhere to metal, or non-polar characteristics to repel water. As a result, conventional coatings may utilize a modified top layer with non-polar water repellent capabilities and a main constituent layer with polar characteristics to adhere to the metal. Consequentially, the waterproofing capabilities of such coating are inversely proportional to the thickness of this top layer, rendering more effective coatings more delicate and more likely to delaminate from the underlying substrate.

Typical corrosion-resistant coatings often utilize epoxy or polyurethane compositions covered with an external layer containing for example sacrificial anodes, such as zinc-based particles. In other cases the hydrophobicity of a typical corrosion-resistant coating can be augmented by increasing its non-polar characteristics for example by introducing longer alkyl chains in the polymeric matrix. However, polar/non-polar incompatibility occurs at the interface of the first layer, primer layers, and between any additional protective layers (such as UV or mechanically protective layers). As such, in order to achieve hydrophobicity on the surface, a large number of layers are required to diminish the polar/non-polar contrast. Other coatings may use amphiphilic surface monolayers, in which molecules with a non-polar head and a polar tail are aligned to repel water. This use of an amphiphilic surface monolayer does not provide a strong, secure barrier and may break down over time. Other approaches may use hydrophobic nano-particles in a polymer matrix that is sufficiently polar so as to adhere to metal, however, these solutions only marginally increase the hydrophobicity of the coating and water will eventually pass between the various molecules, rending the coating ineffective. As such, conventional hydrophobic corrosion-resistant coatings are ineffective for long-term resistance, as water may penetrate the coating, whether due to poor hydrophobicity, damage to the delicate surface layers, or both.

SUMMARY

Accordingly, an ongoing need exists for corrosion resistant coatings with strong adhesion to metal and long-term water repulsion properties. The present embodiments address these concerns by providing corrosion-resistant coatings and methods of making the same that provide improved corrosion-resistance, adhesion to metal, and long-term water repulsion.

One embodiment of the present disclosure is directed to a corrosion-resistant coating containing a plurality of magnetic particles dispersed in a polymer matrix, where the polymer matrix is non-polar and at least partially hydrophobic; and the magnetic particles include an adhesion region containing a ferromagnetic material, and a polymer interface region surrounding the adhesion region comprising a plurality of ligands, where each ligand comprises an anchoring end and a non-polar end.

Another embodiment of the present disclosure is directed to a method of producing a corrosion-resistant article. The method includes applying a corrosion-resistant coating to an article, where the corrosion-resistant coating comprises a plurality of magnetic particles dispersed in a polymer matrix in which the polymer matrix is non-polar and at least partially hydrophobic and the magnetic particles contain an adhesion region comprising a ferromagnetic material and a polymer interface region surrounding the adhesion region comprising a plurality of ligands, where each ligand comprises a polar end and a non-polar end. The method also includes curing the corrosion-resistant coating to produce the corrosion-resistant article.

Additional features and advantages of the described embodiments will be set forth in the detailed description which follows, and in part, will be readily apparent to those skilled in the art from the description or recognized by practicing the described embodiments, including the detailed description and the claims.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

The following description of the embodiments is in no way intended to be limiting in its application or use. Embodiments of the disclosure generally relate to corrosion-resistant coatings 350 and methods of making the same. The corrosion-resistant coating 350 includes a plurality of magnetic particles dispersed in a polymer matrix.

Without being bound by any particular theory, the corrosion-resistant coatings 350 and corrosion-resistant articles of the present disclosure may provide improved hydrophobicity as well as improved attraction to ferromagnetic materials over conventional corrosion-resistant coatings and corrosion-resistant articles. Traditionally, corrosion-resistant coatings are forced to strike a balance between hydrophobicity and attraction to metal which generally have an inverse relationship with an improvement in one parameter detracting from the other parameter. However, the present disclosure provides corrosion-resistant coatings 350 and methods of making corrosion-resistant articles that utilize van der Waal forces to provide hydrophobicity and separately magnetic forces to provide attraction to ferromagnetic materials. The magnetic forces and the van der Waal forces are not competing and do not neutralize effects of the other. As such, the coating of the present disclosure provides improved hydrophobicity and improved attraction to ferromagnetic materials as compared to conventional corrosion-resistant coatings. Specific embodiments will now be described with reference to the figures. Whenever possible, the same reference numerals will be used throughout the drawings to refer to the same or like components. It should be understood that the figures are meant to be representative in nature only and may not be drawn to scale.

Figure 1:
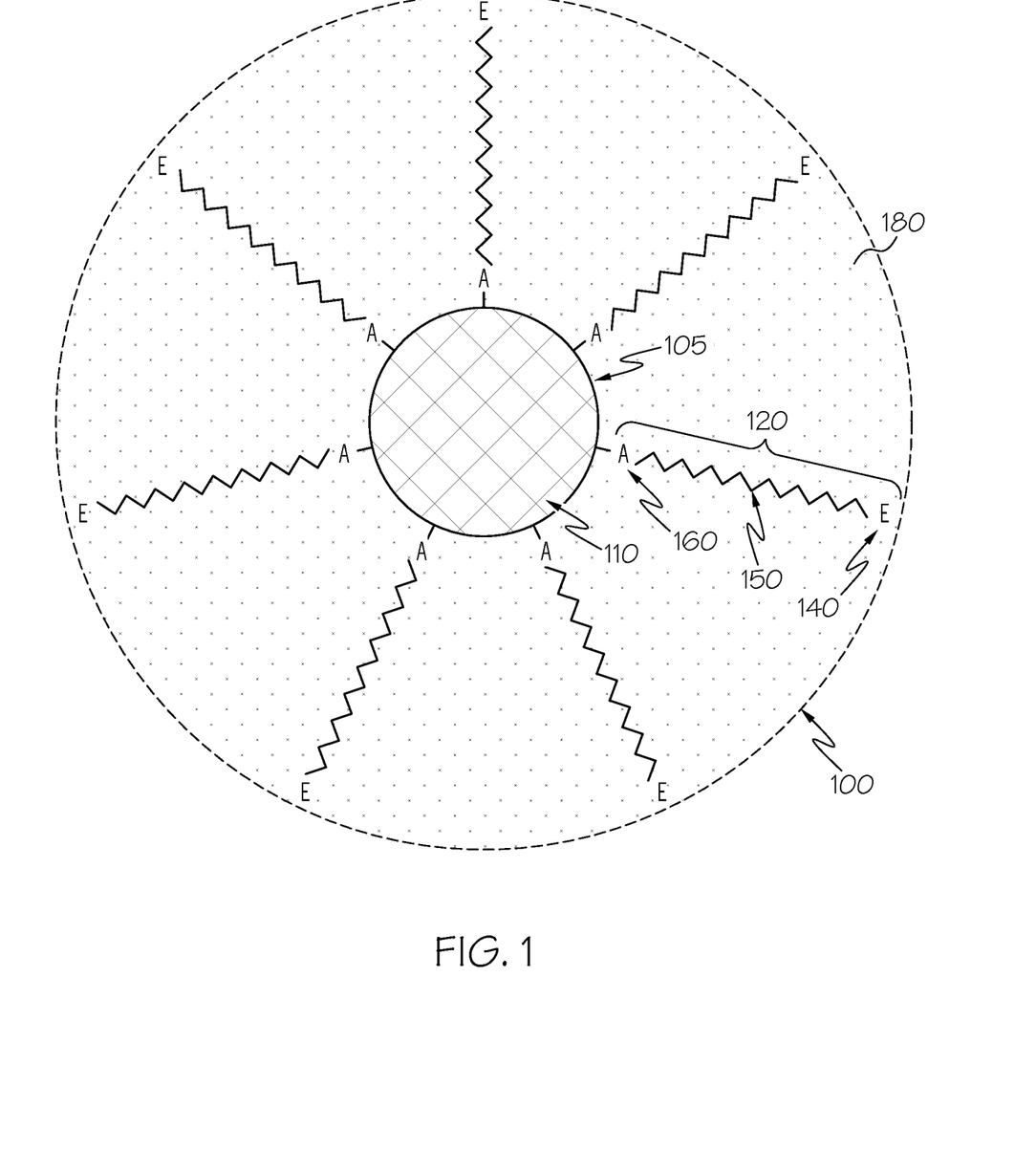
FIG. 1 is a schematic view of a magnetic particle, according to embodiments shown and described herein.

FIG. 1 is a schematic view of a magnetic particle 100 according to embodiments shown and described herein. FIG. 1 depicts an adhesion region 110 surrounded by a plurality of ligands 120, which have a non-polar end 140 and are anchored to the adhesion region 110 by an anchoring end 160. The magnetic particle 100 is disposed in a polymer matrix 240 to form a corrosion-resistant coating 350.

In some embodiments, the adhesion region 110 of the magnetic particle 100 may contain a ferromagnetic material. As used throughout this disclosure, "ferromagnetic" refers to a substance having a high susceptibility towards magnetization, which refers to the ability to be attracted to, be aligned by, or to acquire the properties of a magnet. In at least one embodiment, the adhesion region 110 may be crystalline. In further embodiments, the adhesion region 110 may be semi-crystalline or may be amorphous. Any material can be crystalline, semi-crystalline, or amorphous. In one or more embodiments, an internal region of the adhesion region 110 is crystalline and an outer region of the adhesion region is amorphous. If the nanoparticles are sufficiently small or if the nanoparticle formation is sufficiently rapid, the entire adhesion region 110 of the magnetic particle 100 may be amorphous. For example, there may be magnetic particles 100 with an adhesion region 110 formed from crystalline magnetite ($Fe_3O_4$) having a 10 nanometer (nm) diameter, and further magnetic particles formed from amorphous magnetite. Additionally, the crystallite domains may not extend throughout the magnetic particle 100 with the crystallinity being fragmented. In this case the particle can be considered semi-crystalline. It is clear that the same nano-particle could include all three phases: crystalline, semi-crystalline and amorphous. The advantage of crystalline particles is that the lattice cells are aligned and thus their magnetic attraction force can be higher.

In some embodiments, the adhesion region 110 may be inorganic. The adhesion region 110, and thus, the magnetic particle 100, may be attracted to articles comprising ferromagnetic metal, such as steel, iron, nickel, cobalt, and alloys of these. Without wishing to be limited, suitable materials for the magnetic particle 100 may include oxides such as magnetite and maghemite or metallics.

The magnetic particles 100 may be ferromagnetic nano particles or micro particles. As used within, "nano particles" means particles having an average particle size of 0.1 to 1000 nanometers (nm). Likewise, as used herein, "micro particles" means particles having an average particle size of 0.1 to 1000 micrometers (μm or "microns"). In some embodiments, the magnetic particles 100 may have an average longest dimension, whether width, height, length, or diameter, of from 1 nm to 100 μm (100,000 nm). In various embodiments, the magnetic particles 100 may have an average longest dimension of from 50 nm to 100 μm, from 500 nm to 100 μm, from 100 nm to 1 μm, from 1 nm to 100 nm, from 1 μm to 100 μm, from 50 nm to 100 nm, from 50 μm to 100 μm, or from 1 nm to 50 μm. In certain embodiments, the magnetic particles 100 may have an average longest dimension of from 100 nm to 5000 nm.

The adhesion region 110 may be surrounded by a polymer interface region 180 containing one or more ligands 120. It should be understood that any number of ligands 120 may surround the adhesion region 110. The density of the ligands depends on the characteristic of the particle material, the size of the ligands, their bonding mechanism. The ligands 120 may include an anchoring end 160 and a non-polar end 140. In some embodiments, the ligands 120 may have the general formula $X^A$—R—$X^E$ where $X^A$ is an anchoring end 160, R is a hydrocarbyl chain, and $X^E$ is a non-polar end group 140. As used throughout this disclosure, a "hydrocarbyl chain" or "hydrocarbyl group" refers to a chemical group consisting of carbon and hydrogen. Typically, a hydrocarbyl group may be analogous to a hydrocarbon molecule with a single missing hydrogen where the hydrocarbyl group is connected to another chemical group. The hydrocarbyl group may contain saturated or unsaturated carbon atoms in any arrangement, including straight (linear), branched, aromatic, or combinations of any of these configurations. The hydrocarbyl R group in some embodiments may be an alkyl (—$CH_3$), alkenyl (—CH=$CH_2$), alkynyl (—C≡CH), or cyclic hydrocarbyl group, such as a phenyl group, which may be attached to a hydrocarbyl chain. In some embodiments, R may have from 1 to 100 carbons, such as 1 to 75 carbons, 1 to 50 carbons, or 1 to 25 carbons. In some embodiments, R may have 1 to 35, 1 to 20, 1 to 10, 10 to 50, 10 to 35, or 10 to 20 carbons. Generally, as the chain length increases the polarity of that end of the ligand decreases.

In some embodiments, the ligands 120 may be non-polar. The ligands 120 may stabilize the adhesion region 110 in the polymer matrix 240. In some embodiments, a silane ligand with a long alkyl chain may stabilize a metal oxide particle in a non-polar polymer matrix such as polyethylene. This stabilization provided by chemical interactions also reduces or prevents the agglomeration of nanoparticles in the polymer matrix when still in the liquid or less viscous state.

In some embodiments, the ligands 120 may comprise the curing agent of a polymer, such as the polymer matrix 240, subsequently discussed with reference to FIGS. 3A and 3B. For example, metal nanoparticles may be stabilized by the curing agent of siloxanes. These curing agents are both responsible for the crosslinking of the polymer and for binding the metal nanoparticles to the same elastomer.

Still referring to FIG. 1, the anchoring end, "A" or "$X^A$," 160 may be any suitable component that is capable of anchoring the ligand 120 to the adhesion region 110. The anchoring end 160 may be polar or non-polar. In some embodiments, the anchoring end 160 may be polar to secure the ligands 120 to the adhesion region 110. In some embodiments the anchoring ends 160 may comprise oxygen. In further embodiments, the anchoring ends 160 may comprise sulfur or other electronegative elements.

Similarly, the non-polar end groups, "E", or "$X^E$," 140 may be any suitable non-polar moiety. In some embodiments, the ligand 120 may be an alkyl chain with an end group 140 comprising a methyl group (—$CH_3$) or another suitable alkane group. The end group 140 may be any hydrocarbon, including alkenes and alkynes, or may be comprised of other suitable non-polar groups. In some embodiments, the non-polar end group may be an organosulfur compound.

In some particular embodiments, the anchoring ends 160 may be polar. As such, due to the non-polar end groups 140, the ligands 120 may be amphiphilic, meaning that the ligands 120 may comprise a polar head and a non-polar tail. This may allow the ligands 120 to prevent the magnetic particles 100 in the adhesion region 110 from agglomerating in the polymer matric 240, discussed subsequently with reference to FIGS. 3A and 3B. Without being bound by any particular theory, preventing agglomeration may enable the magnetic particles 100 to uniformly disperse in the polymer matrix 240.

In some embodiments, when stabilizing a magnetic particle in a polymer matrix, the ligand 120 binds its polar side to the adhesion region 110 of the magnetic particle 100 and its non-polar tail to the polymer matrix 240. For example, the ligand 120 may be a silane in which the Si—O group is attached to the adhesion region 110 of the magnetic particle 100 through silanization while the alkyl group binds to alkyl chains of the polymer matrix 240.

Figure 2:
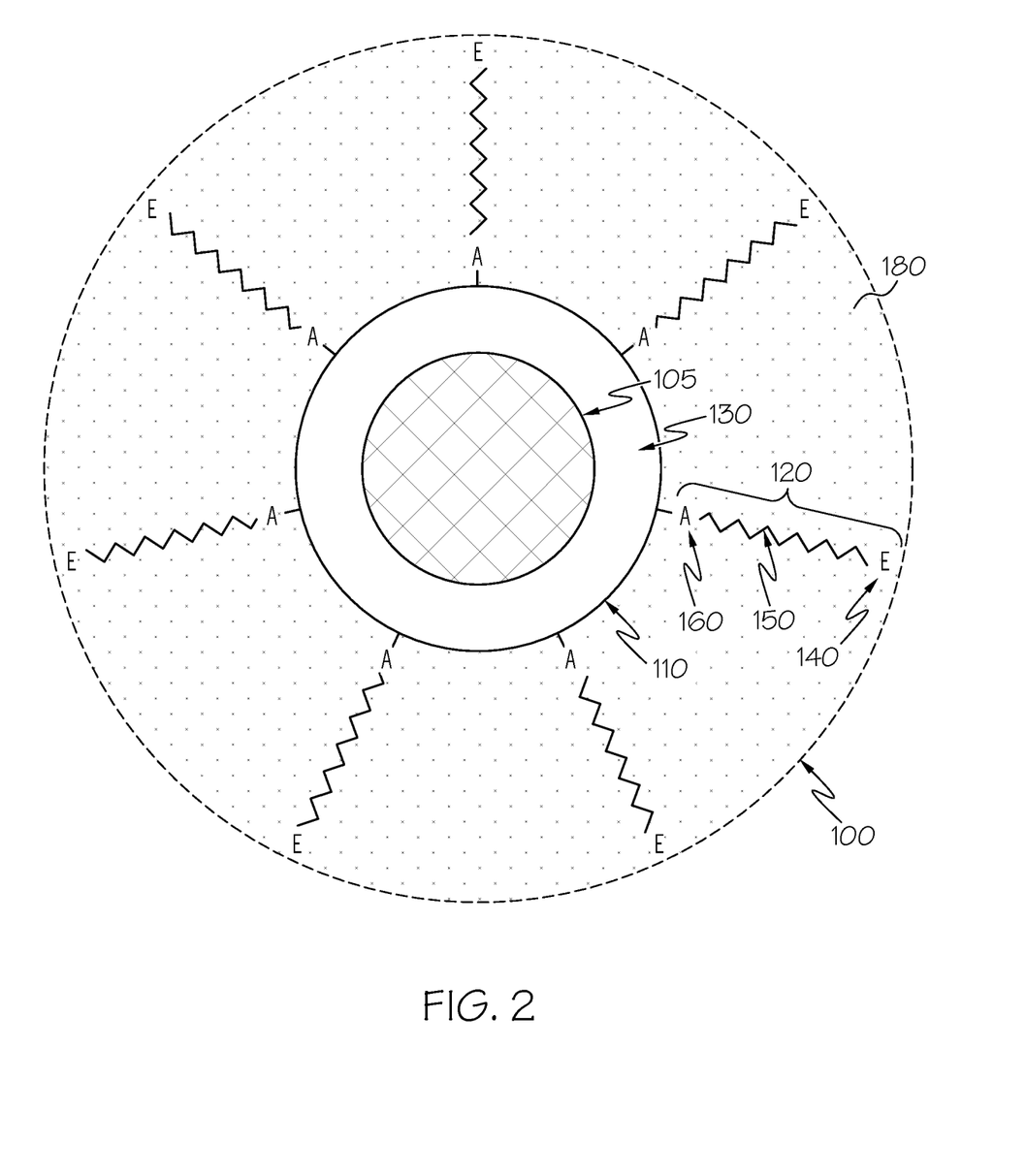
FIG. 2 is a schematic view of a magnetic particle comprising a core-shell structure, according to embodiments shown and described herein.

Referring now to FIG. 2, FIG. 2 is a schematic view of another embodiment of a magnetic particle 100. In FIG. 2, the adhesion region 110 of the magnetic particle 100 comprises a core-shell structure with a core 105 comprising ferromagnetic material and a shell 130 containing a second distinct material. The shell 130 may be crystalline, or may be semi-crystalline or amorphous. The core-shell structure may be comprised of nano or micro-sized particles, which may be magnetic, as previously discussed. Without being bound by theory, the shell 130 may stabilize the adhesion region 110 upon introduction to the polymer matrix 240. In some embodiments, the shell 130 may protect, maintain, and stabilize the crystallinity of the core 105. The ligands 120, containing an anchoring end 160 and a non-polar end group 140 may be in accordance with any of the embodiments previously described with reference to FIG. 1. Similarly, the adhesion region 110 and polymer interface region 180 may be in accordance with any of the embodiments previously described.

In some embodiments, the shell 130 may be formed from silica. The process of formation of the shell 130 over the core 105 may be achieved using any of numerous processes known to those skilled in the art for forming core and shell structures. For example, the shell 130 formed from silica may be prepared using the Stöber method or a modified version of it.

In some embodiments, the shell 130 is formed from a second distinct polymer from the polymer matrix 240. For example, the shell 130, the polymer matrix 240, or both may be formed from one or more of polystyrene, polyvinylidene fluoride (PVDF), and poly(2-vinyl pyridine-b-dimethylsiloxane) (P2VP-b-PDMS).

In some embodiments, the shell 130 may be formed from a magnetic material. The magnetic material of the shell 130 may be in addition to or in lieu of a magnetic material forming the core 105. Specifically, the core 105 and the shell 130 may both comprise a ferromagnetic material, with the ferromagnetic material being the same in some embodiments and differing in additional embodiments. Further, one of the core 105 and the shell 130 may comprise a ferromagnetic material, with the core 105 comprising ferromagnetic material in some embodiments and the shell 130 comprising ferromagnetic material in further embodiments.

Although the shell 130 has been described in terms of "a shell" it will be appreciated that magnetic particles 100 with more than one shell 130 are contemplated as within the scope of this disclosure. Specifically, the magnetic particles 100 may comprise 1, 2, 3, 4, 5, 6, 7, 8, or any number of shells 130 including and not limited to 100 shells 130. The number of shells 130 is only limited by the desired size of the magnetic particles 100 and the desired application and properties of the magnetic particles 100 and the resulting corrosion-resistant coating 350. In one or more embodiments, each shell 130 comprises the same material. In various embodiments with multiple shells 130, the shells 130 comprise two or more differing materials including all ferromagnetic materials or a combination of ferromagnetic and non-ferromagnetic materials.

Figure 3A:
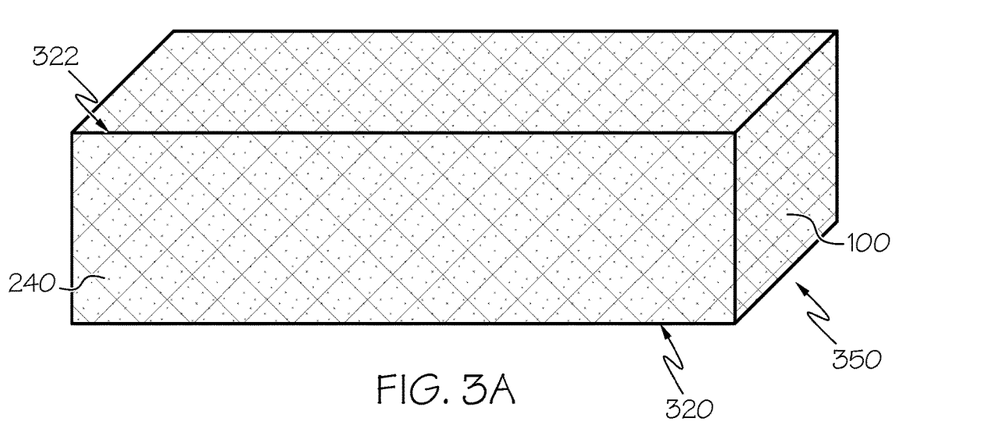
FIG. 3A is a schematic view of a polymeric matrix comprising magnetic particles uniformly distributed within its full thickness, according to embodiments shown and described herein.

Referring now to FIG. 3A, a schematic view of a corrosion-resistant coating 350, which includes a polymer matrix 240 containing magnetic particles 100. In FIG. 3A, the magnetic particles 100 are distributed within the full thickness of the polymer matrix 240. The full thickness of the polymer matrix 240 refers to the distance between a first side 320 and a second side 322 of the polymer matrix, which may be the width, length, height, or depth of the coating, depending on the application of use. The magnetic particles 100 may be distributed among the full thickness of the polymer matrix 240. The distribution of the magnetic particles 100 may be uniform and orderly or may be random and sporadic.

In some embodiments, the magnetic particles 100 may comprise from 1 to 80 weight percentage (wt. %) of the corrosion resistant coating. In various further embodiments, the magnetic particles 100 may comprise from 5 to 70 wt. % of the corrosion resistant coating, comprise from 10 to 50 wt. % of the corrosion resistant coating, or comprise from 20 to 40 wt. % of the corrosion resistant coating. As the wt. % of the magnetic particles 100 within the corrosion resistant coating increases the magnetic force attaching the corrosion resistant coating to a ferromagnetic underlying substrate would increase. Additionally, an increase in the wt. % of the magnetic particles 100 within the corrosion resistant coating also increases the overall weight of the corrosion resistant coating and may result in a reduction in the overall strength of the corrosion resistant coating. Further, an increase in the wt. % of the magnetic particles 100 within the corrosion resistant coating compromises the material integrity of the polymer matrix 240 which may affect the overall integrity of the corrosion resistant coating.

Figure 3B:
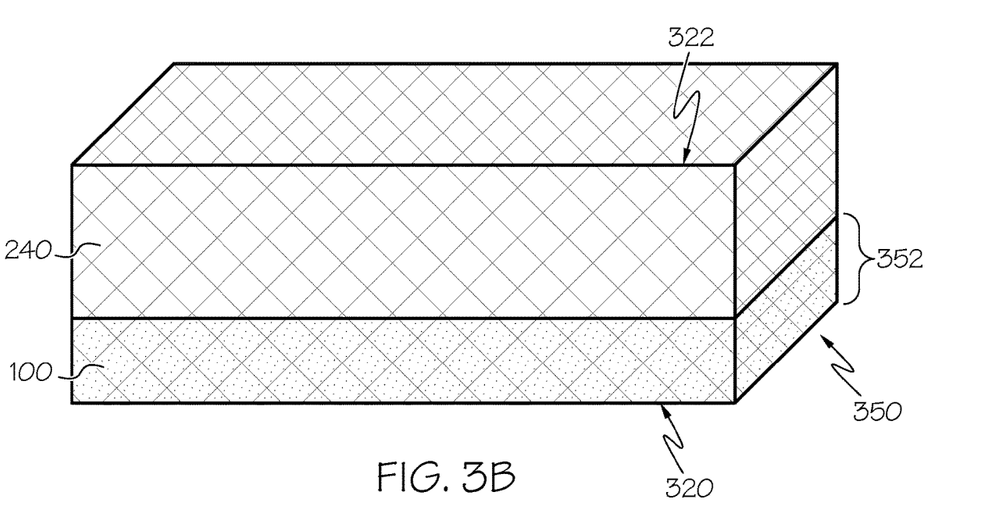
FIG. 3B is a schematic view of another polymeric matrix comprising magnetic particles distributed throughout a partial thickness of the polymer matrix, according to embodiments shown and described herein.

In FIG. 3B, the magnetic particles 100 are not uniformly distributed in the polymer matrix 240, but rather are dispersed near the first side 320 of the polymer matrix 240. In FIG. 3B, the polymer matrix 240 has a first side 320 and a second side 322 positioned opposite of the first side 320. Again it should be understood that these sides 320, 322 may be any sides of the polymer matrix 240. While FIG. 3B depicts the polymer matrix 240 as a rectangular cube for ease in understanding, it should be understood that the polymer matrix 240 may be any shape.

In some embodiments, the magnetic particles 100 may be dispersed closer to the first side 320, the second side 322, or both, of the polymer matrix 240. In some embodiments, the magnetic particles 100 may be dispersed through from 1% to 80% of the full thickness of the polymer matrix 240. For instance, the magnetic particles 100 may be from 1% to 75%, from 1% to 50%, from 10% to 80%, from 10% to 75%, or from 10% to 50% of the full thickness of the polymer matrix 240. In some embodiments, the magnetic particles 100 may be dispersed from 1% to 35%, from 1% to 20%, from 1% to 10%, or from 10% to 35% of the full thickness of the polymer matrix 240.

As shown in FIG. 3B, the magnetic particles 100 may be positioned in closer proximity to the first side 320, forming a magnetically-rich portion 352. The magnetically-rich portion 352 may be the full thickness of the polymer matrix 240 (as shown in FIG. 3A), or may be from 1% to 80% of the full thickness of the polymer matrix 240, such as from 1% to 75%, from 1% to 50%, from 10% to 80%, from 10% to 75%, or from 10% to 50% of the full thickness of the polymer matrix 240. In some embodiments, magnetically-rich portion 352 of the polymer matrix 240 may be from 1% to 35%, from 1% to 20%, from 1% to 10%, or from 10% to 35% of the full thickness of the polymer matrix 240.

The magnetic particles 100 may be dispersed in the polymer matrix 240 in a homogenous or a non-homogenous distribution. For example, in at least one embodiment, the magnetic particles 100 may be evenly dispersed in the polymer matrix 240 with the concentration of the magnetic particles 100 substantially consistent throughout the polymer matrix 240. In various further embodiments, the magnetic particles may form a concentration gradient or tiered concentrations across the thickness of the polymer matrix 240. For example, the magnetic particles may be at a first concentration proximal one surface of the polymer matrix 240 and have a relative concentration of 75%, 50%, 25%, 10%, or 5% proximal an opposing surface of the polymer matrix 240 with the reduction in a step-wise or gradient fashion across the thickness of the polymer matric 240.

The magnetic particles 100 may be in accordance with any of the embodiments previously described with reference to FIGS. 1 and 2. Any suitable polymer may be used for the polymer matrix 240. In some embodiments, the polymer matrix 240 may be a hydrophobic polymer. As used throughout this disclosure, "hydrophobic" refers to such as a lack of attraction to water, repulsion to water, or immiscibility in water. Water contact angles can be utilized to evaluate hydrophobicity of the polymer matrix 240. In one or more embodiments, the water contact angle of the polymer matrix 240 may be from 90 to 180°. Without being bound by any particular theory, the polymer matrix 240 may be caused by crosslinking between the polymeric molecules. In some embodiments, the polymer matrix 240 may contain silicone and may be a silicone-based polymer. In various further embodiments, the polymer matrix 240 may comprise polyethylene, polypropylene, or other polymers known to one skilled in the art. In some embodiments, the polymer matrix 240 may be a thermosetting polymer.

Various methods are contemplated for dispersing the magnetic particles 100 inside of the polymer matrix 240 to form the corrosion-resistant coating 350. In some embodiments, the formed magnetic particles 100 may be mixed or otherwise combined with the polymer matrix 240 to form the corrosion-resistant coating 350. For example, a magnet or ferromagnetic material may be milled and mixed with ligands 120 to create the magnetic particles 100, which may be mixed in the polymer matrix 240. Additionally, magnetic particles 100 having the core-shell structure may be added to the uncured polymer matrix 240.

In some embodiments, the magnetic particles 100 may be added to a preformed polymer to form the corrosion-resistant coating 350. For example, the polymer matrix 240 may be melted and mixed with magnetic particles 100. Upon solidification, the magnetic particles 100 are entrained in the polymer matrix 240. In some embodiments, the preformed polymer matrix 240 may be fully cured before the magnetic particles 100 are added. In some embodiments, the polymer matrix 240 may be polymerized before addition of the magnetic particles 100, but any solvents are not removed to retain the polymer matrix 240 in a liquid state until addition of the magnetic particles 100.

In some embodiments, the magnetic particles 100 may be synthesized inside of the polymer matrix 240. For example, the core-shell structure of the magnetic particles 100 may be synthesized in-situ within the formed polymer matrix 240.

In some embodiments, the corrosion-resistant coating 350 may be formed by fabricating the magnetic particles 100 and dispersing the magnetic particles 100 in a curing agent. The magnetic particles 100 may be dispersed into a curing agent, combined with the polymer matrix 240, and applied to an article before curing, forming a corrosion-resistant article.

In some embodiments, the polymer matrix 240 may be cured to form the corrosion-resistant coating 350 prior to applying the coating to an article. In some embodiments, the cured corrosion-resistant coating 350 may be applied to an article by wrapping or otherwise covering the article with the coating. The choice of a suitable production method may depend on the desired method of use. If the article to be coated has a smooth and regular surface, the corrosion-resistant coating 350 may be applied as a preformed wrapping in a cured state. If the article to be coated is irregular with blind recesses or a non-smooth surface the corrosion-resistant coating 350 may be applied in the liquid phase and cured, polymerized, solidified, or hardened in place. The corrosion-resistant coating 350 in the liquid phase may be applied with a sprayer, brush, or other application method known to one skilled in the art for applying a liquid to a surface.

In some embodiments, the corrosion-resistant coating 350 may be removable. In some embodiments, the corrosion-resistant coating 350 may be removed by triggering an electromagnetic signal to reduce or remove the adhesion between the corrosion-resistant coating 350 and the article. In some embodiments, the adhesion between the corrosion-resistant coating 350 and the article may be tuned and adjusted by varying the amount of magnetic material in the adhesion region 110, discussed with reference to FIGS. 1 and 2, in each magnetic particle 100 or varying the number and concentration of magnetic particles 100 in the polymer matrix 240. In some embodiments, electrical signals may be used to alter the magnetic strength of the magnetic particles 100, allowing the adhesive properties of the magnetic particles 100 to be switched on or off. The magnetic strength may also be adjusted by varying the electrical current surrounding the magnetic particles 100.

Further, in some embodiments, electrical signals may be used to readjust and reposition the corrosion-resistant coating 350 on the article, or to remove and replace the corrosion-resistant coating 350 on another article or device. This removability allows the same corrosion-resistant coating 350 to be reused in multiple locations or instances. The mechanism of removability is based on the magnetism of the magnetic particles 100 and the commensurate attraction to the underlying substrate to be coated with the corrosion-resistant coating 350. The magnetic particles 100 retain the corrosion-resistant coating 350 in contact with a metallic underlying substrate by applying a force to it perpendicular and opposite to the position of the underlying substrate. The distance between the magnetic particles 100 and the underlying metallic substrate determines the strength of the attraction between the two elements. The attractive force is inversely proportional to the square of the distance between the elements according to equation (1) where F is the force, $q_{m1}$ and $q_{m2}$ express the strengths or the magnetic dipoles, μ is the permeability of the medium separating the magnetic dipoles and r is the distance.

$$F = \frac{\mu q_{m1} q_{m2}}{4\pi r^2} \qquad \text{Equation (1)}$$

Without being bound by theory, the present disclosure uniquely utilizes magnetism as an attractive force, along with van de Waal interactions between the magnetic particles 100 and the polymer matrix 240. The present disclosure may allow for the corrosion-resistant coating 350 to exhibit better adhesion and better water resistance than conventional corrosion-resistant coatings, while additionally allowing the corrosion-resistant coating 350 to be repositionable and reusable.

In some embodiments, electrical signals may be used to deactivate or reduce the magnetic attraction between the article and the corrosion-resistant coating 350 such that the corrosion-resistant coating 350 may be removed from the article. As a magnetic field can be also generated by a moving charge, the intensity of the field generated by the magnetic particles 100 in the corrosion-resistant coating 350 can be modulated by utilizing a device that produces a current in proximity to the magnetic particles 100 to reduce or increase the magnetic force while maintaining the same distance between the magnetic particles 100 and the metallic surface to be coated. Once removed, the corrosion-resistant coating 350 may be repaired, rejuvenated, and then reapplied to the article with little or no damage to the coating, the article, or both. Conventional corrosion-resistant coatings are not easily removed without substantially damaging the article, the coating, or both.

It should be understood that the magnetic particles 100 may congregate in any number of ways, including arrangements in which the magnetic particles 100 are dispersed near both the first side 320 and the second side 322 with few or no magnetic particles 100 located in the center of the polymer matrix 240. As used throughout this disclosure, "few" refers to less than or equal to 5 wt. % of the total about of particles, such as less than or equal to 3 wt. %, less than or equal to 2 wt. %, less than or equal to 1 wt. %, or even less than or equal to 0.5 wt. % of the total weight of the particles. Alternatively, the magnetic particles 100 may be grouped closer to a particular side of the polymer matrix 240, a particular edge of the polymer matrix 240, or in another suitable arrangement. The magnetically-rich portion 352 may be located in any section of the corrosion-resistant coating 350.

In some embodiments, a majority of the magnetic constituents may be in proximity to the side of the polymeric component that will be in direct contact with the article to increase and optimize the attraction between the corrosion-resistant coating 350 and the article. In other embodiments, it may be desirable to have a majority of the magnetic constituents in proximity to the side of the polymeric coating that is not in direct contact with the article so as to decrease the attraction and the strength of the bond between the corrosion-resistant coating 350 and the article.

Further, as mentioned, in some embodiments, the arrangement of the magnetic particles 100 inside of the polymer matrix 240 may be manipulated to disperse the magnetic particles 100 closer to the first side 320, the second side 322, both sides 320 and 322, or neither side 320, 322 (such that the magnetic particles 100 may be dispersed only in the middle of the full thickness of the polymer matrix 240). Without being bound by any particular theory, controlling the dispersion of the magnetic particles 100 may allow for control over the strength of the magnetism of the corrosion-resistant coating 350 to increase or decrease the magnetism. This may allow the corrosion-resistant coating 350 to form a strong bond between ferromagnetic materials, and may also allow the strong bond to be broken so that the corrosion-resistant coating 350 may be removed, replaced, and, if desired, reattached.

Embodiments of the disclosure also relate to methods of producing corrosion-resistant articles. The method may include applying a corrosion-resistant coating 350 to an article and curing the coating. The corrosion-resistant coating 350 may be in accordance with any of the embodiments previously described. Specifically, the corrosion-resistant coating 350 may include a plurality of magnetic particles dispersed in a polymer matrix. In some embodiments, the polymer matrix may be non-polar and at least partially hydrophobic. The magnetic particles may include an adhesion region containing a ferromagnetic material and a polymer interface region surrounding the adhesion region that contains a plurality of ligands. The ligands may include a polar end and a non-polar end. The magnetic particles and polymer matrix may be in accordance with any of the embodiments previously described.

In some embodiments, the article may be, for instance, tooling, piping, machinery, framework, appliances, and other such items. In some embodiments, the article may be metal. The article may be made of steel, iron, nickel, cobalt, and alloys of these, or other such metals.

Any known suitable methodology may be used for applying the corrosion-resistant coating 350 to the article. The coating may be placed on the article, sprayed onto the article, painted or coated onto the article, or otherwise applied.

As previously stated, the corrosion-resistant coating 350 may be cured before, during, or after applying the coating to the article. The coating may be cured using any known curing techniques. In some embodiments, the coating may be cured using an oven or an autoclave. In various embodiments, the coating may be cured at a temperature of from 0° C. to 200° C. or from 10° C. to 60° C. The coating may be cured after applying the coating to an article, or alternatively, the coating may be cured and then subsequently applied to the article.

In some embodiments, the method may include first producing the corrosion-resistant coating 350 before applying the coating to the article. Producing the corrosion-resistant coating 350 may include synthesizing the magnetic particles dispersed in the polymer matrix in-situ, or producing the coating by adding the magnetic particles to the polymer matrix in an uncured state and subsequently curing the polymer matrix. One method of producing the corrosion-resistant coating 350 includes adding the magnetic particles 100 to a solubilized pre-formed polymer. A further method includes adding a magnetic oxide precursor to a solubilized pre-formed polymer. The magnetic oxide precursor transitions to the magnetic particles 100 upon reduction with a reducing agent. Additionally, the corrosion-resistant coating 350 may be formed by adding a magnetic oxide precursor to a pre-polymer and reducing the magnetic oxide precursor into the magnetic particles 100 during the polymerization. In this case the reducing agent may be, for example, ammonia or the curing agent of the polymer itself. Add the magnetic particles to the pre-polymer and reduce the oxide into the magnetic particles during the polymerization. In this case the reducing agent can be for example ammonia or the curing agent of the polymer itself.

It should now be understood the various aspects of the corrosion-resistant coatings and methods of making the same are described and such aspects may be utilized in conjunction with various other aspects.

In a first aspect, the disclosure provides a corrosion-resistant coating. The corrosion-resistant coating comprises a plurality of magnetic particles dispersed in a polymer matrix. The polymer matrix is non-polar and at least partially hydrophobic. The magnetic particles comprise an adhesion region comprising a ferromagnetic material, and a polymer interface region surrounding the adhesion region comprising a plurality of ligands. Each ligand comprises an anchoring end proximal the adhesion region and a non-polar end proximal the polymer matrix.

In a second aspect, the disclosure provides the coating of the first aspect in which the ligands comprise the general formula $X^A$—R—$X^E$. $X^A$ is an anchoring moiety proximal the adhesion region, where the anchoring moiety is polar, R is a hydrocarbyl chain, and $X^E$ is an end group proximal the polymer matrix, where the end group is non-polar.

In a third aspect, the disclosure provides the coating of the second aspect in which the anchoring moiety comprises oxygen or sulfur.

In a fourth aspect, the disclosure provides the coating of the second or third aspects in which the hydrocarbyl chain comprises from 1 to 100 carbons.

In a fifth aspect, the disclosure provides the coating of any of the first through fourth aspects in which the magnetic particles have an average longest dimension of from 1 nanometers (nm) to 100 micrometers (μm).

In a sixth aspect, the disclosure provides the coating of any of the first through fifth aspects in which the magnetic particles have an average longest dimension of from 50 nm to 100 μm.

In a seventh aspect, the disclosure provides the coating of any of the first through sixth aspects in which the magnetic particles are dispersed through the full thickness of the polymer matrix.

In an eighth aspect, the disclosure provides the coating of any of the first through seventh aspects in which the magnetic particles are dispersed through from 10% to 50% of the full thickness of the polymer matrix.

In a ninth aspect, the disclosure provides the coating of any of the first through eighth aspects in which the adhesion region of the magnetic particles comprises a core-shell structure with the ferromagnetic material forming a core and a second distinct material forming a shell surrounding the core.

In a tenth aspect, the disclosure provides the coating of the ninth aspect in which the shell is crystalline.

In an eleventh aspect, the disclosure provides the coating of the ninth aspects in which the shell is amorphous.

In a twelfth aspect, the disclosure provides the coating of any of the first through eleventh aspects in which the ferromagnetic material is crystalline.

In a thirteenth aspect, the disclosure provides a method of producing a corrosion-resistant article. The method comprises applying a corrosion-resistant coating to an article. The corrosion-resistant coating comprises a plurality of magnetic particles dispersed in a polymer matrix. The polymer matrix is non-polar and at least partially hydrophobic. The magnetic particles comprise an adhesion region comprising a ferromagnetic material, and a polymer interface region surrounding the adhesion region comprising a plurality of ligands. Each ligand comprises a polar end and a non-polar end. The method further comprises curing the corrosion-resistant coating to produce the corrosion-resistant article.

In a fourteenth aspect, the disclosure provides the method of the thirteenth aspect in which the ligands comprise the general formula $X^A$—R—$X^E$. $X^A$ is an anchoring moiety proximal the adhesion region, where the anchoring moiety is polar. R is a hydrocarbyl chain. $X^E$ is an end group proximal the polymer matrix, where the end group is non-polar.

In a fifteenth aspect, the disclosure provides the method of the thirteenth or fourteenth aspects in which the corrosion-resistant coating is cured with a curing agent and the curing agent also functions as the ligand.

In a sixteenth aspect, the disclosure provides the method of any of the thirteenth through fifteenth aspects in which the method further comprises producing the corrosion-resistant coating by synthesizing the plurality of magnetic particles dispersed in the polymer matrix in-situ.

In a seventeenth aspect, the disclosure provides the method of any of the thirteenth through fifteenth aspects in which the method further comprises producing the corrosion-resistant coating by adding the plurality of magnetic particles to the polymer matrix in an uncured state, and subsequently curing the polymer matrix.

In an eighteenth aspect, the disclosure provides the method of any of the thirteenth through seventeenth aspects in which the polymer matrix is a thermosetting polymer.

In a nineteenth aspect, the disclosure provides the method of any of the thirteenth through eighteenth aspects in which the curing step occurs before the corrosion-resistant coating is applied to the article.

In a twentieth aspect, the disclosure provides the method of any of the thirteenth through eighteenth aspects in which the curing step occurs after the corrosion-resistant coating is applied to the article.

It will be apparent to those skilled in the art that various modifications and variations may be made to the embodiments described herein without departing from the spirit and scope of the claimed subject matter. Thus, it is intended that the specification cover the modifications and variations of the various embodiments described herein provided such modification and variations come within the scope of the appended claims and their equivalents. Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

Unless otherwise defined, all technical and scientific terms used in this disclosure have the same meaning as commonly understood by one of ordinary skill in the art. The terminology used in the description is for describing particular embodiments only and is not intended to be limiting. As used in the specification and appended claims, the singular forms "a," "an," and "the" are intended to include the plural forms as well, unless the context clearly indicates otherwise.

What is claimed is:

1. A corrosion-resistant coating comprising a plurality of magnetic particles dispersed in a polymer matrix, where the polymer matrix is non-polar and at least partially hydrophobic;
where the plurality of magnetic particles comprise:
an adhesion region comprising a ferromagnetic material, and
a polymer interface region surrounding the adhesion region comprising a plurality of ligands, where the plurality of ligands comprise the general formula $X^A$—R—$X^E$, where:
$X^A$ is an anchoring moiety proximal the adhesion region, where the anchoring moiety is polar;
R is a hydrocarbyl chain;
$X^E$ is an end group proximal the polymer matrix, where the end group is non-polar; and
the plurality of ligands are bound to the adhesion region;
where the plurality of magnetic particles are dispersed through from 1% to 80% of the full thickness of the polymer matrix; and
where the plurality of magnetic particles have an average longest dimension of from 500 nanometers (nm) to 100 micrometers (μm).

2. The corrosion-resistant coating of claim 1, where the anchoring moiety comprises oxygen or sulfur.

3. The corrosion-resistant coating of claim 1, where the hydrocarbyl chain comprises from 1 to 100 carbons.

4. The corrosion-resistant coating of claim 1, where the plurality of magnetic particles have an average longest dimension of from 1 μm to 100 μm.

5. The corrosion-resistant coating of claim 1, where the plurality of magnetic particles have an average longest dimension of from 50 μm to 100 μm.

6. The corrosion-resistant coating of claim 1, where the plurality of magnetic particles are dispersed through from 10% to 50% of the full thickness of the polymer matrix.

7. The corrosion-resistant coating of claim 1, where the adhesion region of the plurality of magnetic particles comprises a core-shell structure with the ferromagnetic material forming a core and a second distinct material forming a shell surrounding the core.

8. The corrosion-resistant coating of claim 7, where the shell is crystalline.

9. The corrosion-resistant coating of claim 7, where the shell is amorphous.

10. The corrosion-resistant coating of claim 1, where the ferromagnetic material is crystalline.

11. A method of producing a corrosion-resistant article, the method comprising:
applying a corrosion-resistant coating to an article, where the corrosion-resistant coating comprises a plurality of magnetic particles dispersed in a polymer matrix,
where the polymer matrix is non-polar and at least partially hydrophobic; and
the plurality of magnetic particles comprise:
an adhesion region comprising a ferromagnetic material, and
a polymer interface region surrounding the adhesion region comprising a plurality of ligands, where the plurality of ligands comprise the general formula $X^A$—R—$X^E$, where
$X^A$ is an anchoring moiety proximal the adhesion region, where the anchoring moiety is polar;
R is a hydrocarbyl chain; and
$X^E$ is an end group proximal the polymer matrix, where the end group is non-polar; and
the plurality of ligands are bound to the adhesion region;
where the plurality magnetic particles are dispersed through from 1% to 80% of the full thickness of the polymer matrix;
where the plurality of magnetic particles have an average longest dimension of from 500 nanometers (nm) to 100 micrometers (μm); and
curing the corrosion-resistant coating to produce the corrosion-resistant article.

12. The method of claim 11, where the corrosion-resistant coating is cured with a curing agent and the curing agent also functions as the plurality of ligands.

13. The method of claim 11, further comprising producing the corrosion-resistant coating by synthesizing the plurality of magnetic particles dispersed in the polymer matrix in-situ.

14. The method of claim 11, further comprising producing the corrosion-resistant coating by adding the plurality of magnetic particles to the polymer matrix in an uncured state, and subsequently curing the polymer matrix.

15. The method of claim 11, where the polymer matrix is a thermosetting polymer.

16. The method of claim 11, where the curing step occurs before the corrosion-resistant coating is applied to the article.

17. The method of claim 11, where the curing step occurs after the corrosion-resistant coating is applied to the article.

* * * * *